United States Patent [19]

Fan

[11] Patent Number: 4,636,230
[45] Date of Patent: Jan. 13, 1987

[54] APPARATUS FOR AIR COMPRESSING AND DUST COLLECTING

[76] Inventor: Tzeng-Yuan Fan, No. 123, Sec.5, Yen Ping N. Road, Taipei, Taiwan

[21] Appl. No.: 805,723

[22] Filed: Dec. 6, 1985

[51] Int. Cl.⁴ .......................... B01D 47/02; A47L 9/12
[52] U.S. Cl. ........................................ 55/274; 15/328; 15/339; 15/345; 55/357; 55/385 R; 55/471
[58] Field of Search ...................... 15/4, 314, 328, 329, 15/339, 344, 345; 55/274, 357, 385 R, 385 A, 385 B, 467, 471, DIG. 17

[56] References Cited

U.S. PATENT DOCUMENTS

| | | | |
|---|---|---|---|
| 1,443,435 | 1/1923 | Rohrer | 55/385 R X |
| 1,691,988 | 11/1928 | Olson | 55/385 R X |
| 1,970,674 | 8/1934 | Seibert et al. | 15/314 |
| 2,902,708 | 9/1959 | Riley | 15/344 X |
| 3,381,335 | 5/1968 | Schaedlich et al. | 15/328 X |
| 3,513,500 | 5/1970 | Hori | 55/471 X |
| 3,599,273 | 8/1971 | Shirayanagi et al. | 55/467 X |
| 3,869,265 | 3/1975 | Wolter et al. | 55/274 |
| 4,302,225 | 11/1981 | Eckart et al. | 55/357 X |
| 4,311,439 | 1/1982 | Stofen | 55/385 R X |
| 4,323,375 | 4/1982 | Chang | 55/274 X |
| 4,342,133 | 8/1982 | Minton | 55/274 X |
| 4,363,156 | 12/1982 | Leinfelt | 55/467 X |
| 4,371,322 | 2/1983 | Lorraine | 55/385 B X |

FOREIGN PATENT DOCUMENTS

| | | | |
|---|---|---|---|
| 289556 | 1/1916 | Fed. Rep. of Germany | 15/328 |
| 280118 | 11/1927 | United Kingdom | 15/328 |

Primary Examiner—Robert Spitzer
Attorney, Agent, or Firm—Lowe, Price, LeBlanc, Becker & Shur

[57] ABSTRACT

This invention relates to an apparatus for air compressing and dust collecting and particularly to one which comprises a housing. A 12V DC motor having a shaft is disposed in the housing. A propeller is loosely mounted on the first end of the shaft and can be driven to rotate by means of a clutch which is secured to the first end thereof and controlled by a sliding member so that this apparatus can be served as a dust collector. A gear is loosely mounted on the second end of the shaft and can be driven to rotate by means of another clutch which is secured to the second end thereof and controlled by the sliding member. The gear is arranged to mesh in a reduction gear on which a linking rod is eccentrically disposed. A cylinder with a piston received therein is adjacent to the reduction gear and the piston therein is connected to the linking rod such that when the gear is driven to rotate, the reduction gear in turn is rotated to drive the piston to move back and forth along the axial direction of the cylinder thereby achieving the air compressing purpose.

1 Claim, 6 Drawing Figures

APPARATUS FOR AIR COMPRESSING AND DUST COLLECTING

BACKGROUND OF THE INVENTION

This invention relates to an apparatus for air compressing and dust collecting.

In general, the air compressor can be used to force the air into a tire of a car while a dust collector is used to collect the dust on the ground or somewhere else. However, such two products have never been combined together therefore it is necessary for us to combine the air compressor with the dust collector to form a single unit thus capable of providing a more flexible device.

It is, therefore, an object of the present invention to obviate and mitigate the above-noted drawback.

SUMMARY OF THE INVENTION

It is the primary object of the present invention to provide an apparatus for air compressing and dust collecting wherein the air compressor and the dust collector are combined together to form a single unit thereby increasing the practical value of such device.

It is another object of the present invention to provide an apparatus for air compressing and dust collecting wherein the size of such device can be significantly reduced therefore it can be easily carried and conveniently operated.

It is a further object of the present invention to provide an apparatus for air compressing and dust collecting which is practical for use.

DETAILED DESCRIPTION OF THE PREFERRED EMBODIMENT

Figure 2:
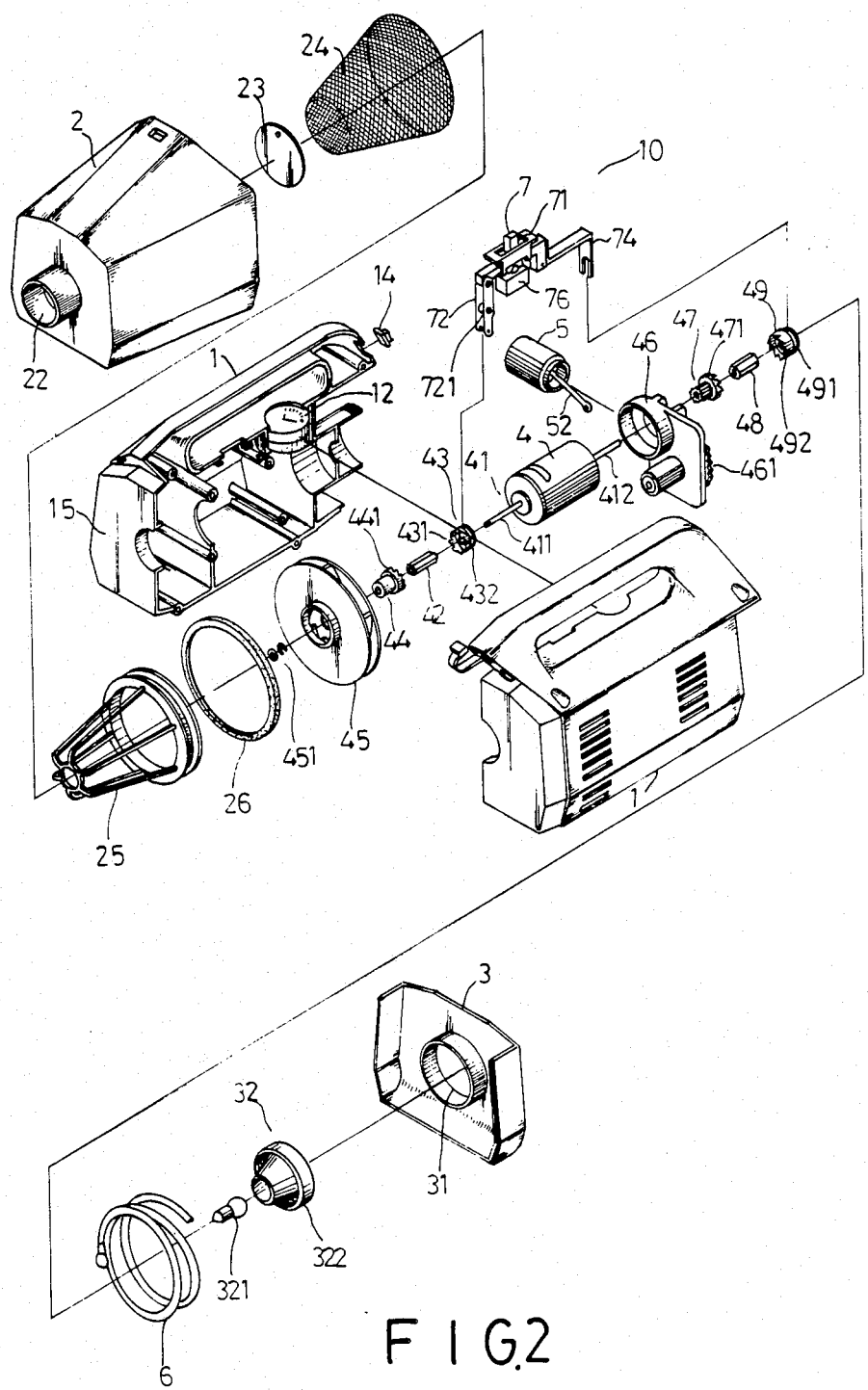
FIG. 2 is a fragmentary perspective view of FIG. 1.
Figure 3:
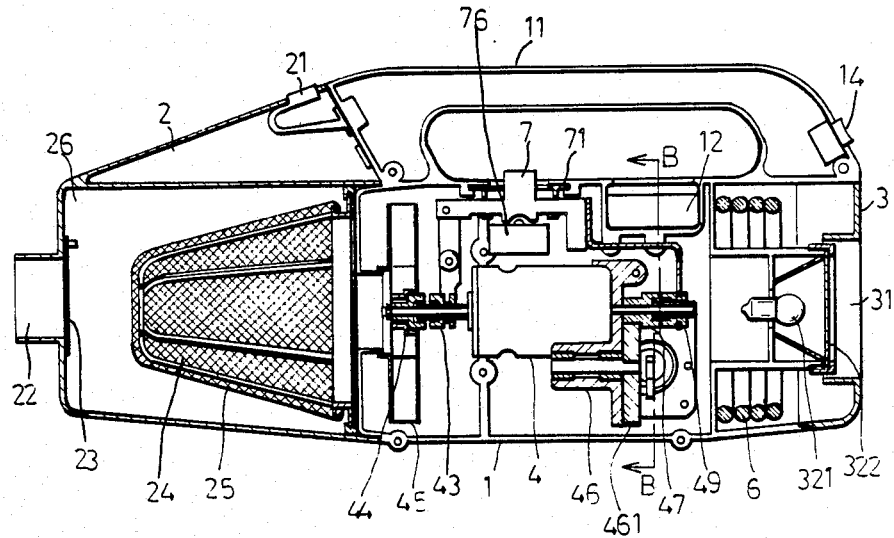
FIG. 3 is a cross-sectional view taken along the line A—A of FIG. 1.

Referring to the drawings and particularly to FIGS. 2 and 3, an apparatus (10) for air compressing and dust collecting comprises a housing (1) which can be seperated into a pair of half parts. The housing (1) is provided at the top with a handle (11) below which a pressure gauge (12) is disposed. A front cover (2) is arranged to be secured to the front end of the housing (1) by means of the commonly used fastening member (21). The front cover (2) is furnished with an inlet (22) through which the dust can be sucked into a container (26) formed between the front cover (2) and the front wall (15) of the housing (1). A rubber piece (23) is disposed on the inner side of the inlet (22) of the front cover (2). A tapered frame (25) having a tapered filter (24) covered thereon is disposed in the front cover (2) and an annular washer (26) is located between the tapered frame (25) and the front wall (15) of the housing (1).

A 12 V DC motor (4) provided with a shaft (41) is disposed in the housing (1). A hexagonal sleeve (42) is secured to the first end (411) of the shaft (41) while a clutch (43) having a hexagonal hole (not shown) formed on the center thereof is slidably mounted on the hexagonal sleeve (42). The clutch (43) is provided at one end with a toothed portion (431) and at the other end with a slot (432). A sleeve (44) is joined at one end with a propeller (45) and is provided at the other end with a toothed portion (441) which is arranged to mesh in the toothed portion (431) of the clutch (43). The sleeve (44) with the propeller (45) disposed thereon is loosely mounted on the first end (411) of the shaft (41) by means of a washer (not shown) and a retaining ring (451) so that the shaft (41) can make free rotation therein.

A supporting frame (46) is secured to the rear end of the motor (4) with the second end (412) of the shaft (41) passing therethrough. The supporting frame (46) is furnished with a reduction gear (461). A gear (47) arranged to mesh in the reduction gear (461) is loosely mounted on the second end (412) of the shaft (41) so that the shaft (41) can make free rotation therein. The gear (47) also is provided with a toothed portion (471). A hexagonal sleeve (48) is secured to the second end (412) of the shaft (41) while a clutch (49) having a hexagonal hole (not shown) formed on the center thereof is slidably mounted on the hexagonal sleeve (48). The clutch (49) is provided at one end with a slot (491) and at the other end with a toothed portion (492) which is arranged to mesh in the toothed portion (471) of the gear (47).

Figure 6:
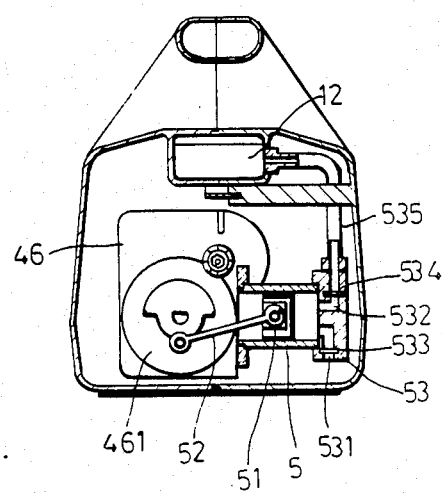
FIG. 6 is a cross-sectional view taken along the line B—B of FIG. 3.

Referring to FIGS. 2 and 6, a cylinder (5) with a piston (51) sealingly received therein is disposed in the housing (1) and adjacent to the reduction gear (461). A linking rod (52) is connected at one end to the piston (51) of the cylinder (5) and the other end thereof is connected to the reduction gear (461) in an eccentric manner. Therefore, when the reduction gear (461) is driven to rotate, the linking rod (52) can drive the piston (51) to move back and forth along the axial direction of the cylinder (5). The cylinder (5) is provided with a cover (53) which is provided at the bottom with an inlet (531) which is associated with a check valve (533) and at the top with an outlet (532) which is associated with a check valve (534). The outlet (532) is connected through the pressure gauge (12) to a rubber hose (6) (FIG. 2) by means of a tube (535) or other suitable means. The rubber hose (6), when unused, can be received in the rear portion of the housing (1) as shown in FIG. 3.

Figure 4:
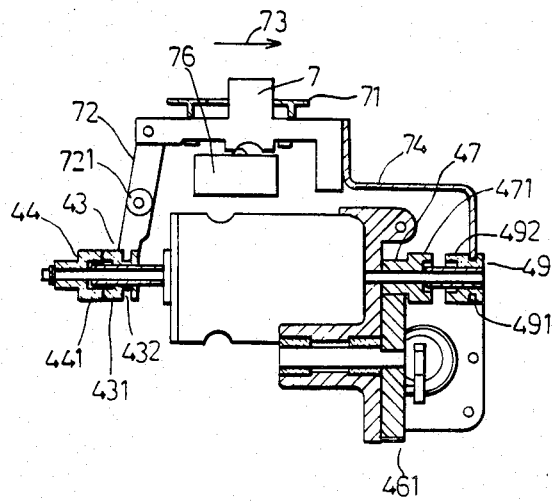
FIG. 4 is a local cross-sectional view thereof illustrating the sliding member being moved along the direction of arrow so that the clutch can mesh in the sleeve.
Figure 5:
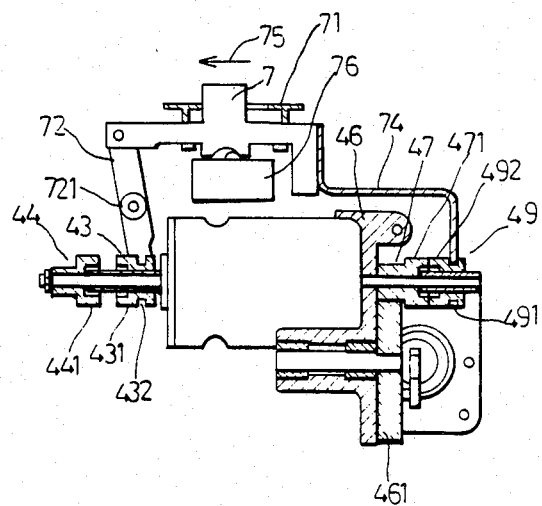
FIG. 5 is a local cross-sectional view thereof showing the sliding member being moved along the direction of arrow whereby another clutch can mesh in the gear.

A sliding member (7) is disposed in a seat (71) which is disposed in the housing (1) and located above a switch (76) which is arranged to control the motor (4). A lever (72) of which the fulcrum is located at point (721) is pivotally connected at the upper end to one end of the sliding member (7). The lower end of the lever (72) is arranged to be tightly engaged with the slot (432) of the clutch (43) so that when the sliding member (7) is moved along the direction of arrow (73) as shown in FIG. 4, the toothed-portion (431) of the clutch (43) will mesh in the toothed portion (441) of the sleeve (44) meanwhile the sliding member (7) can turn on the switch (76) to actuate the motor (4) to rotate. A S-shaped member (74) is secured at upper end to the other end of the sliding member (7). The lower end of the S-shaped member (74) is tightly engaged with the slot (491) of the clutch (49) so that when the sliding member (7) is moved along the direction of arrow (75), as shown in FIG. 5, the toothed portion (492) of the clutch (49) will mesh in the toothed portion (471) of the gear (47) meanwhile the sliding member (7) again can turn on the switch (76) to actuate the motor (4) to rotate.

Figure 1:
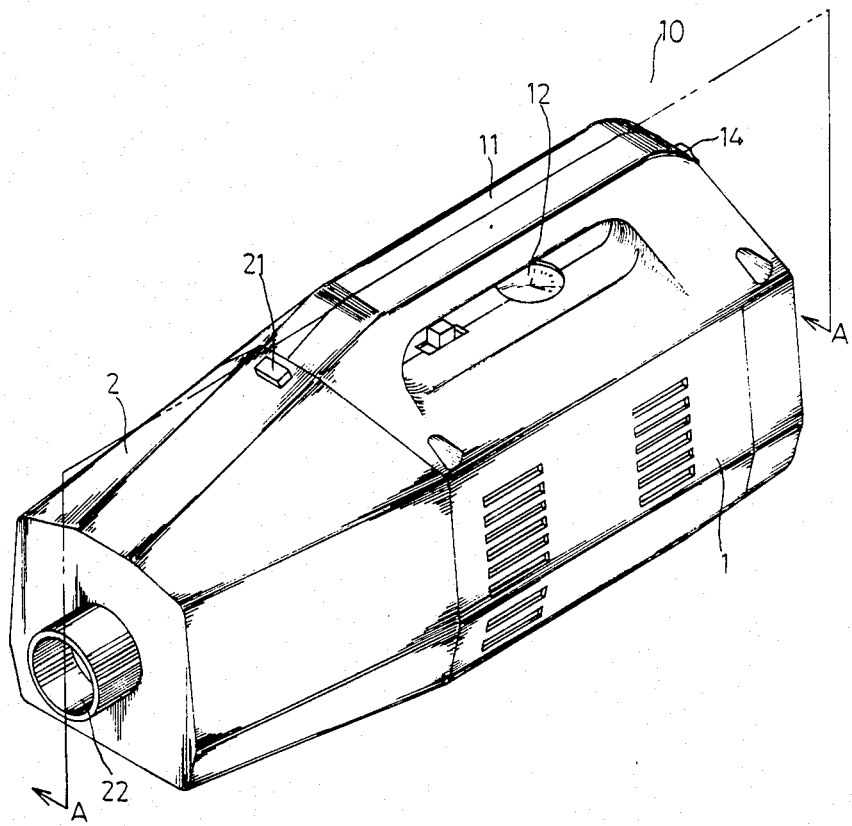
FIG. 1 is a perspective view of a preferred embodiment of the present invention.

Referring to FIG. 2, a rear cover (3) provided with a central hole (31) is arranged to be secured to the rear end of the housing (1). A lamp assembly (32) composed of a lamp (321) and a lamp socket (322) is disposed on the rear cover (3) to illuminate through the central hole (31) thereof. A switch (14) (FIG. 1) disposed on the rear end of the handle (11) is used to control the lamp assembly (32).

In use, referring to FIG. 3, when the sliding member (7) is located at the center of the seat (71), the clutches (43) and (49) will respectively disengage from the toothed portion (441) of the sleeve (44) and the toothed portion (471) of the gear (47). Besides, the sliding member (7) will not actuate the switch (76) therefore the motor (4) will be in its off state.

Referring to FIG. 4, when the sliding member (7) is moved along the direction of arrow (73), the lever (72) will drive the clutch (43) to mesh in the sleeve (44) and then can actuate the motor (4) to drive the propeller (45) to rotate thereby capable of sucking the dust through the inlet (22) into the container (26). Thus this present invention is served as a dust collector.

Referring to FIG. 5, when the sliding member (7) is moved along the direction of arrow (75), the S-shaped member (74) will drive the clutch (49) to mesh in the gear (47) and then can actuate the motor (4) to drive the reduction gear (461) to rotate in a predetermined manner thereby the piston (51) of the cylinder (5) can be driven to move back and forth therealong by means of the linking rod (52) so that the air can be sucked into the cylinder (5) through the inlet (531) and the check valve (533) and then the air can be forced through the outlet (532), the check valve (534) and the rubber hose (6) into a tire of a car. Therefore, this present invention can be served as an air compressor.

Accordingly, this invention has the following advantages:

1. The present invention combines the dust collector with the air compressor to form a single unit thereby capable of increasing the practical value of such device.

2. The size of this invention is significantly reduced therefore it can be easily carried and conveniently operated.

3. This invention has additional illuminating means which can provide practical use and the rubber hose, when unused, can be received in the housing of this device thereby capable of maintaining the outer appearance thereof.

It is noted that the speed of the motor for dust collecting is 15300 R.P.M.

Furthermore, the different speeds of the motor for air compressing are as follow:

a. when the pressure is 0, the speed of the reduction gear is 3200 R.P.M.

b. when the pressure is 2.5 Kg/cm, the speed of the reduction gear is 2850 R.P.M. and c. when the pressure is 7 Kg/cm, the speed of the reduction gear is 2500 R.P.M. and d. when the pressure is 12 Kg/cm, the speed of the reduction gear is 2200 R.P.M.

Since, the pressure of the tire for a car usually is 2.5 Kg/cm while for a truck 8 Kg/cm, therefore, it is sufficient to prove that this invention can be served as a practical air compressor to force the air into the above-noted tire.

I claim:

1. An apparatus for air compressing and dust collecting comprising:

a housing capable of being separated into a pair of half parts, the housing being provided at the top with a handle, a pressure gauge being disposed on the housing and located below the handle;

a front cover being secured to the front end of the housing by means of fastening means, the front cover being furnished with an inlet through which the dust can be sucked into a container disposed in the housing;

a rubber piece being disposed on the inner side of the inlet of the front cover;

a frame having a filter covered thereon being disposed in the front cover;

an annular washer being located between the frame and the front wall of the housing;

a motor provided with a shaft being disposed in the housing;

a hexagonal sleeve being secured to the first end of the shaft;

a first clutch having a hexagonal hole formed on the center thereof being slidably mounted on the hexagonal sleeve, the clutch being provided at one end with a toothed portion and at the other end with a slot;

a sleeve being jointed at one end with a propeller and provided at the other end with a toothed portion which is arranged to mesh in the toothed portion of the first clutch, the sleeve with the propeller disposed therein being loosely mounted on the first end of the shaft so that the shaft of the motor can make free rotation therein;

a supporting frame being secured to the motor with the second end of the shaft passing through the supporting frame, the supporting frame being furnished with a reduction gear;

a gear arranged to mesh in the reduction gear being loosely mounted on the second end of the shaft so that the shaft can make free rotation therein, the gear is provided with a toothed portion;

a hexagonal sleeve being secured to the second end of the shaft;

a second clutch having a hexagonal hole formed on the center thereof being slidably mounted on the hexagonal sleeve, the clutch being furnished at one end with a slot and at the other end with a toothed portion which is arranged to mesh in the toothed portion of the gear;

a cylinder with a piston sealingly received therein being disposed in the housing;

a linking rod being connected at one end to the piston of the cylinder and the other end thereof being connecting to the reduction gear in an eccentric manner whereby when the reduction gear is driven to rotate, the linking rod can drive the piston to move back and forth along the axial direction of the cylinder;

a cover being secured to the cylinder, the cover being provided at the bottom with an inlet which is associated with a check valve and at the top with an outlet which is associated with a check valve, the outlet of the cover being connected through the pressure gauge to a rubber hose which, when unused, can be received in the rear portion of the housing, a sliding member being disposed in a seat which is disposed in the housing and located above a switch which is arranged to control the motor, a lever being pivotally connected at the upper end to one end of the sliding member, the lower end of the lever being arranged to tightly engage with the slot of the first clutch, a S-shaped member being secured at upper end to the other end of the S-shaped member being arranged to tightly engage with the slot of the second clutch;

a rear cover provided with a central hole being arranged to be secured to the rear end of the housing;

a lamp assembly being disposed on the rear cover to illuminate through the central hole of the rear cover, and a switch disposed on the rear end of the handle being used to control the lamp assembly.

* * * * *